(12) United States Patent
Moeller

(10) Patent No.: US 8,469,552 B2
(45) Date of Patent: Jun. 25, 2013

(54) STREET LIGHTING DEVICE

(75) Inventor: Dennis Moeller, Lippstadt (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days.

(21) Appl. No.: 13/294,722

(22) Filed: Nov. 11, 2011

(65) Prior Publication Data

US 2012/0120666 A1    May 17, 2012

Related U.S. Application Data

(63) Continuation of application No. PCT/EP2010/056453, filed on May 11, 2010.

(30) Foreign Application Priority Data

May 13, 2009    (DE) .......................... 10 2009 021 182

(51) Int. Cl.
F21V 3/00    (2006.01)
(52) U.S. Cl.
USPC ................................ 362/311.02; 362/311.06

(58) Field of Classification Search
USPC .................. 362/311.01, 311.02, 311.06, 308, 362/309, 327, 336
See application file for complete search history.

(56) References Cited

U.S. PATENT DOCUMENTS 1,977,689 A * 10/1934 Muller ...................... 340/815.76
6,724,543 B1 * 4/2004 Chinniah et al. .............. 359/718

* cited by examiner

*Primary Examiner* — Vip Patel
(74) *Attorney, Agent, or Firm* — Yakov Sidorin, Esq.; Quarles & Brady LLP

(57) ABSTRACT

A lighting device for streets, paths, and the like, includes a lighting unit containing a lighting element and a lens arranged in front of the lighting element in the main emission direction to produce a specified light distribution characteristic. The lens includes a light entrance surface on a light entrance side facing the lighting element and a light exit surface on a light exit side facing away from the lighting element, at which surfaces the light is refracted. The light entrance surface and/or the light exit surface of the lens is shaped in a direction transverse to the optical axis of the lighting element in such a way that the luminous intensity of the coupled out light, starting from a center plane that intersects with the optical axis, rises with an increasing emission angle from the optical axis at least partially according to a tangent function.

20 Claims, 7 Drawing Sheets

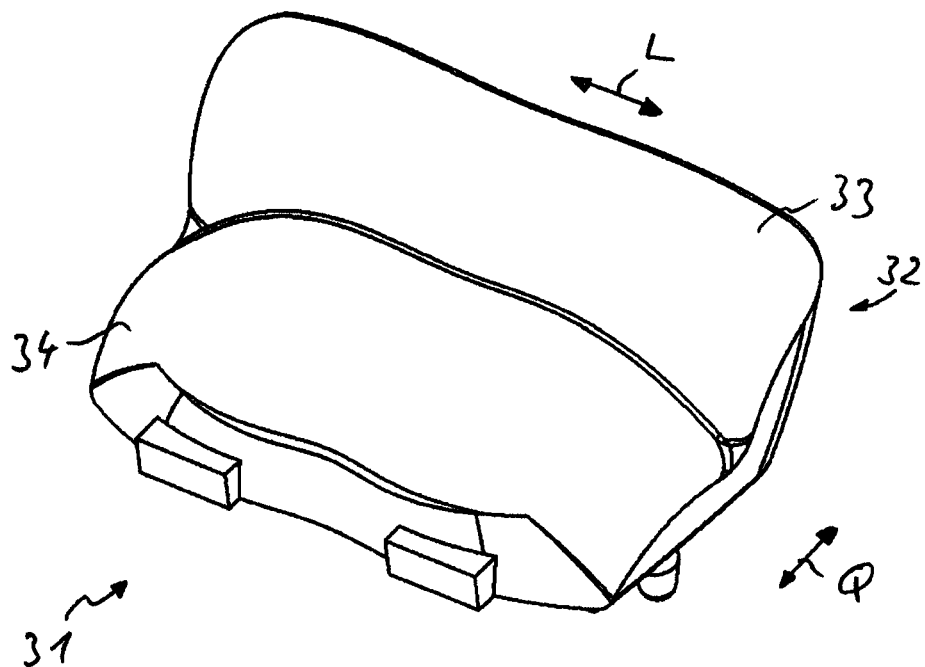
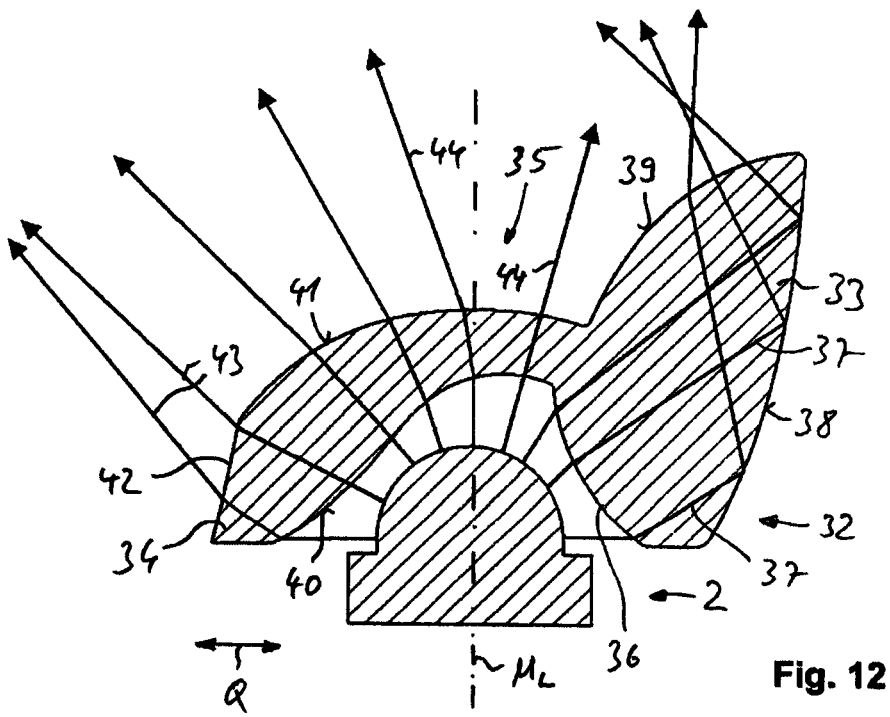

STREET LIGHTING DEVICE

PRIORITY CLAIM

The present application is a continuation of a currently pending International Patent Application No. PCT/EP2010/056453 filed on May 11, 2010, which designates the United States and claims priority from and benefit of the German Patent Application No. 10 2009 021 182.9 filed on 13 May 2009. The present application claims priority from and benefit of the aforementioned International Patent Application and, through this International Patent Application, a priority from and benefit of the above mentioned German Patent Application. Disclosure of each of the above-mentioned patent applications is incorporated herein by reference in its entirety.

BACKGROUND OF THE INVENTION

1. Field of the Invention

The invention relates to a lighting device for streets, pathways and the like, with a lamp unit including a light source and, positioned in front of the light source in the main emission direction, a lens configured to generate a predefined light distribution pattern.

2. Description of Relevant Art

DE 103 30 261 A1 describes a vehicular lighting device which, in addition to a light source and a reflector, is equipped with a lens positioned in front of the light source in the emission direction. The lens is rotationally symmetrical relative to the optical axis of the light source and on the side facing away from the light source it features a total-reflection surface, reflecting the light impinging on it in a direction perpendicular to the main emission and onto a light-exit perimeter. The light is thus deflected sideways toward the reflector surface, with the lens essentially serving as a means for redirecting light toward the lateral reflector surface and not only for generating a predefined light distribution pattern.

EP 1 916 468 A1 describes a lighting device with a lamp unit for streets, pathways and the like, including a light source and, positioned in front of the light source in the main emission direction, a lens serving to generate a predefined light distribution pattern. The lens is dome-shaped and centrically symmetric relative to points on an optical axis of the light source, and features on a light-exit side of the lens facing away from the light source several segmented free-form areas. A light-entrance surface positioned on a light-entrance side facing the light source is spherically shaped. Depending on the curvature of the light-entrance surface of the lens, larger or smaller rectangular light distribution patterns can be generated. However, the lamp units can only serve to illuminate a partial area of a street section that is to be lit. To fully illuminate the entire object street section it is necessary to combine lamp units with variously contoured or shaped lenses.

SUMMARY OF THE INVENTION

The embodiments are based on the object of developing further the design of a lighting device in a manner whereby, in a simple fashion and as needed, a predefined light distribution is achieved for the homogeneous illumination of an area.

In an embodiment a lighting device for streets, pathways and the like, with a lamp unit that includes a light source and, positioned in front of the light source in the direction of the main emission, a lens configured for generating a predefined light distribution characteristic. The lens has a light-entrance surface at a light-entrance side facing the light source for coupling in light from the light source. It furthermore has a light-exit surface at a light-exit side facing away from the light source for coupling out light from the lens. Furthermore the light-entrance surface and/or the light-exit surface of the lens is configured in a direction extending transversely relative to the optical axis of the light source in a manner whereby, starting from a central plane that intersects the optical axis, the light intensity of the coupled out light rises at an increasing emission angle relative to the optical axis at least in part along a tangent function.

The particular advantage stems from the fact that, by conforming the lens to the emission characteristic of the light source, a light beam can be emitted whose light intensity rises at an increasing emission angle relative to the optical axis corresponding to a tangent function. Advantageously, therefore, a preferably rectangular area, especially a street, can be evenly illuminated.

In one preferred embodiment, a light-entrance surface and/or light-exit surface of the lens is configured in a manner whereby the light intensity increases according to a tangent function in the longitudinal direction up to a first characteristic angle and in the transverse direction up to a second characteristic angle, with the first characteristic angle being larger than the second characteristic angle. The first characteristic angle may be in an angular range between 55° and 75°. In an LED light source with a Lambert emission characteristic the characteristic angle is about 55°. The first characteristic angle and the second characteristic angle are emission angles relative to the optical axis at which the light intensity reaches its maximum in the longitudinal and, respectively, in the transverse direction. At emission angles exceeding the characteristic angles the light intensity decreases again, with the decrease from the maximum light intensity preferably following a cosine curve. Advantageously, a homogeneous illumination of a rectangular area is possible while at the same time it avoids blinding persons at a distance. The assumption is that the optical axis of the lamp unit extends in a direction perpendicular to the street surface to be illuminated, so that persons who are farther away and sees the lighting device at a relatively flat angle will not be blinded.

In a further embodiment the lens is of a conchiform design with two opposing longitudinal side sections that are connected by a central section. Each side section features a marginal surface from which a partial light beam, coupled at a relatively large emission angle in relation to the optical axis, is totally reflected in the direction of the light-exit side. These side sections extend along both sides of the longitudinal central plane, whereby the converging deviation of the partial light beam through the side section results in a smaller beam width in the transverse direction and thus, in simple fashion, in a rectangular illumination of the street.

In a preferred embodiment, the lens features longitudinal sections, each having an ascending lateral wing and a descending lateral wing. The ascending lateral wing has a lateral surface which totally reflects part of the incident light beam in a manner whereby, in the direction of the optical axis and longitudinal central plane and intersecting these, the light beam is coupled out. The descending lateral wing is merely provided with surface areas by which the incident light beam is refracted in the direction of the longitudinal central axis without intersecting the longitudinal central axis. Advantageously, this may result in a lamp unit which in its transverse direction exhibits a relatively strong asymmetry while preferably permitting an extended lighting range. Since in the descending lateral wing the light is merely coupled out through refraction, the material cost can be reduced.

In a further embodiment, the longitudinal side sections of the lens can extend symmetrically or asymmetrically relative to the longitudinal central axis. Advantageously, a symmetric configuration of the longitudinal side sections will illuminate a rectangular area with the lamp unit essentially centered above the street. An asymmetric configuration of the longitudinal side sections will illuminate a rectangular area with the lamp unit positioned at a distance from the center.

In a first variation, lateral surfaces and a front surface of a first longitudinal side section may be so configured that the incident light beam is coupled out at an acute deflection angle. The result is a uniform light flux, which enhances the generation of a homogeneous light distribution.

In a further embodiment, the lateral surface and a front surface of a second longitudinal side section are so configured that the light beam coupled into the second longitudinal side section will be coupled out, intersecting the optical axis, at a relatively large deflection angle. Together with an opposite first longitudinal side section this permits the generation of an asymmetric light distribution, so that the lamp unit can be positioned for instance at the edge of a street that is to be illuminated. It also lends itself well to linear illumination.

In a further embodiment, a front surface of the central section, facing away from the light source, is oval-shaped while a light-entrance surface facing the light source is bell-shaped. In contrast to a circular exit surface, the oval exit surface (front surface of the central section) offers the advantage whereby the maximum emission angle is determined by marginal areas of the longitudinal side section. Advantageously, this permits positioning the lens closer to other components of the lighting device without shadows effects in the light distribution.

In a further embodiment, the light source is a LED light source, preferably with a beam angle greater than 70°. If the beam angle of the light source were smaller, the total-reflection surfaces of the lateral surface sections would be ineffective.

BRIEF DESCRIPTION OF THE DRAWINGS

In the following, the invention will be described by way of example, without limitation of the general inventive concept, on examples of embodiment and with reference to the drawings.

FIG. 11 is a perspective illustration of a lens in another embodiment;

FIG. 12 is a cross section view of a lamp unit with a lens according to FIG. 11.

Figure 1:
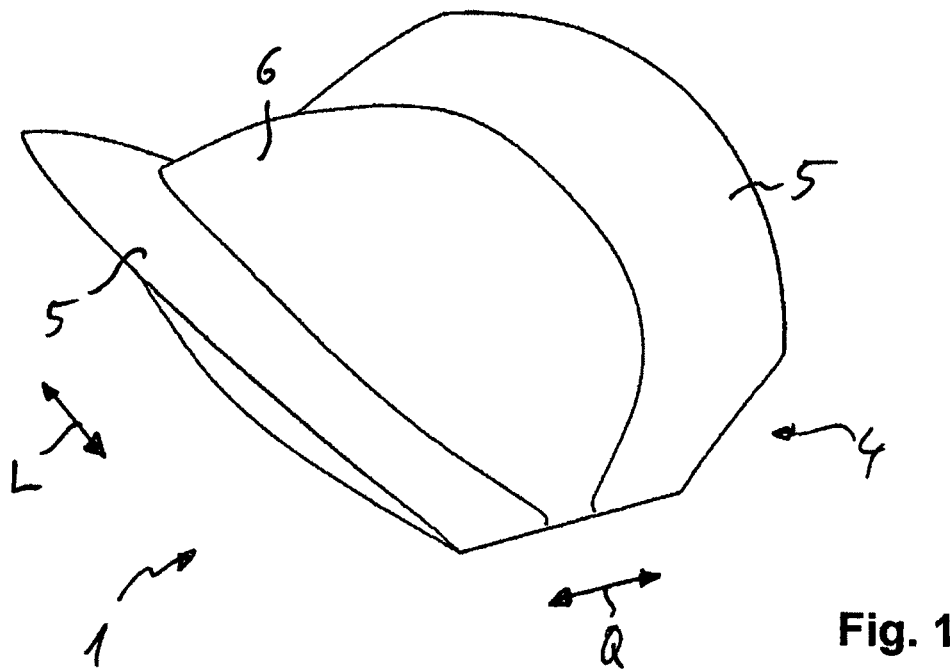
FIG. 1 is a top view of the lens of a lamp unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

A lighting device for streets, pathways and the like may incorporate for instance a frame-shaped housing, not illustrated, which may be flange-mounted on a pole. The housing may integrally contain at least one light-source module so that, when the lighting device is switched on, it can illuminate a surface or spatial area of the street. The housing of the lighting device may be positioned at a predefined distance from the street surface, with at least one light module extending parallel to the street surface.

The light modules preferably are of a linear or elongated form and extend on the same, common plane of installation. For example, the light modules may be arranged in a manner whereby the lighting device is of a frame-, line-, star- or cross-shaped configuration. In a first embodiment the light modules feature a number of lamp units 1 row-mounted on a common support in a recess of the housing. The support and the array of lamp units 1 of a light module (for instance eight light modules) are closed off by a common transparent cover pane.

The lamp unit 1 essentially includes a light source 2 in the form of an LED chip and, positioned in the direction and in front of the main emission 3, a lens 4.

Lens 4 preferably is conchiform or has a batwing-shaped cross section and features two longitudinal side sections 5 in opposing positions relative to the longitudinal central plane $M_L$, as well as a central section 6 connecting the longitudinal side sections 5. In an embodiment, lamp unit 1 depicted in FIGS. 1 to 6 has identically shaped longitudinal side sections 5, so that lens 4 is symmetrical not only relative to the longitudinal central plane $M_L$ but also relative to a transverse central plane $M_Q$.

Figure 2:
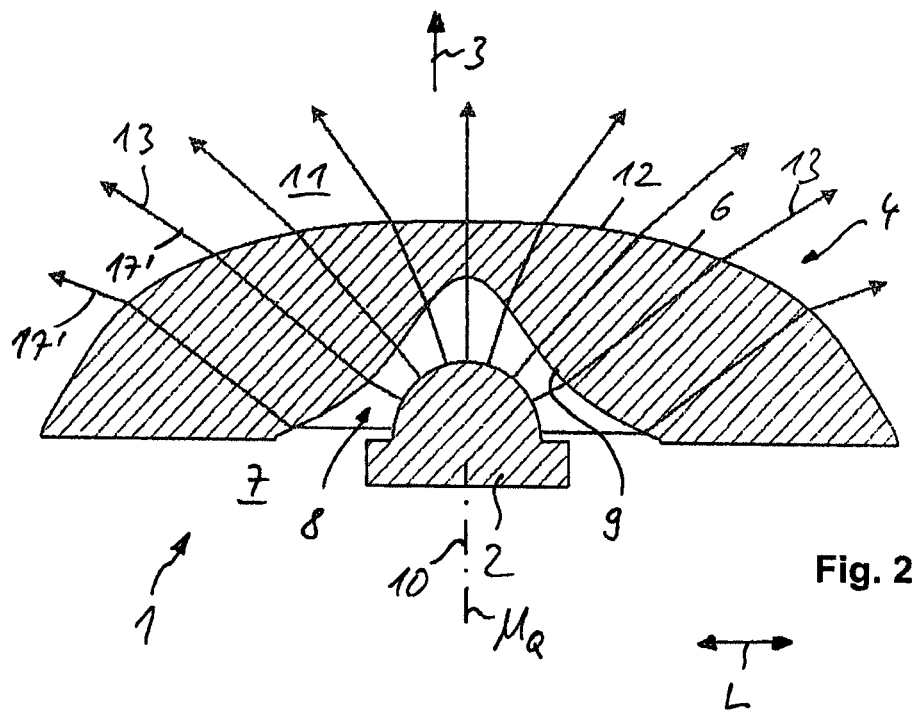
FIG. 2 is a longitudinal section view of a lamp unit in a first embodiment.
Figure 3:
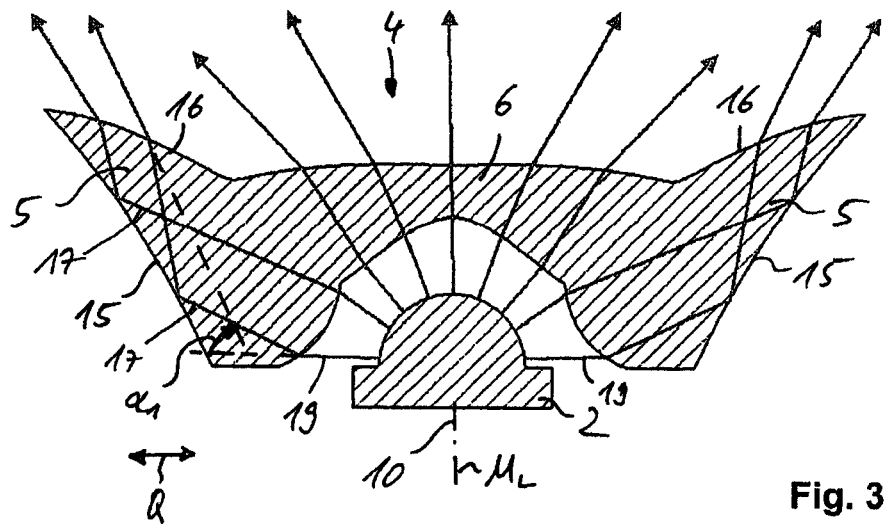
FIG. 3 is a cross section view of the lamp unit in its first embodiment.

As shown in FIG. 2, the LED light source 2 is positioned on a light-entrance side 7 of lens 4 in a cavity 8 at a distance from a bell-shaped light-entrance surface 9 of lens 4. The bell-shaped light-entrance surface 9 is preferably rotationally symmetric in relation to an optical axis 10 of light source 2 and lens 4.

On a light-exit side 11 of lens 4, facing away from light source 2, at least the central section 6 is provided with a longitudinally oval light-exit surface 12.

Accordingly, in the longitudinal direction L of lens 4, the light-entrance surface 9, serving as the entrance optic, and the light-exit surface 12 of lens 4, serving as the exit optic, are so shaped that a light intensity distribution curve K1 (light distribution characteristic) is generated whose light intensity increases in the longitudinal direction, starting from an emission angle $\Theta$ whose value in the optical axis 10 is zero, along a tangent function as shown below.

$$I(\theta) = I_{max} \cdot \frac{\tan(\theta)}{\tan(\theta_{Imax})}$$

Figure 4:
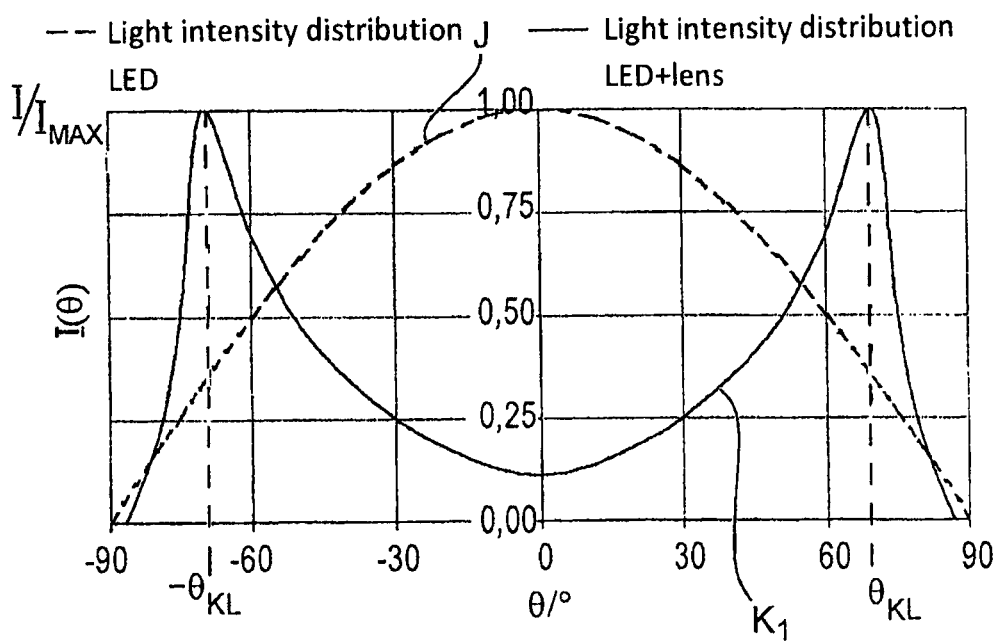
FIG. 4 is a light intensity distribution curve of the lamp unit in its first exemplified embodiment.
Figure 5:
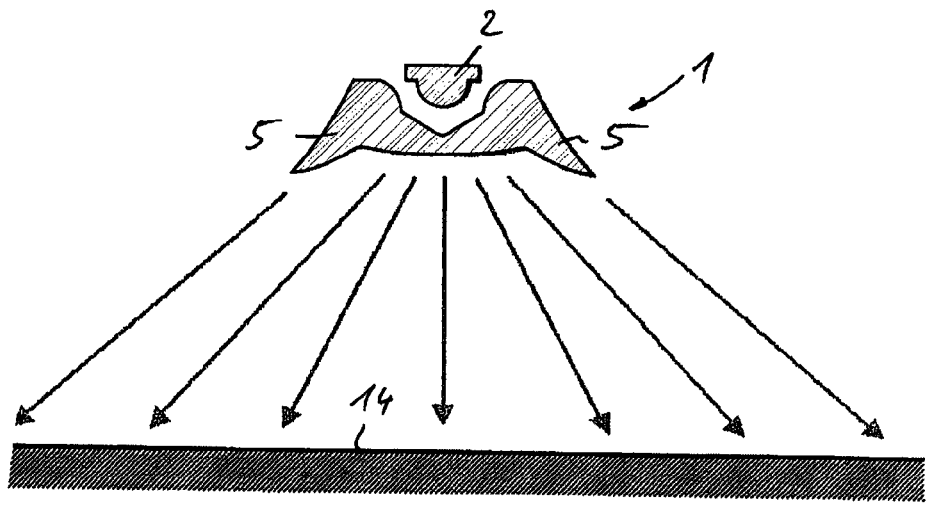
FIG. 5 is a schematic vertical section view of the lamp unit, for use as a street lamp, in its first embodiment for the symmetric illumination of a street area.

I(Θ): Light intensity in the direction of angle Θ
$I_{max}$: Maximum light intensity generated
$\Theta_{Imax}$: Angle at which maximum light intensity is generated As can be seen in FIG. 4, the light intensity distribution $K_1$ reaches its maximum at emission angle $\Theta_{KL}=70°$, then drops back down to emission angle $\Theta=90°$ toward zero. The light intensity gradient is steepest in the range between 50° and 80°. For a better understanding, FIG. 4 additionally shows a light intensity distribution J of LED light source 2 that is configured as a Lambertian emitter. Due to the geometry of light-entrance surface 9 and light-exit surface 12 in the longitudinal direction L the light rays 13 are refracted at the boundary surfaces of lens 4 from optical axis 10 and the transverse central plane $M_Q$ in a manner whereby the maxima are generated in the range of the first characteristic angles $\Theta_{KL}$, $\Theta_{KL}$. The drop in the light intensity distribution above the stated characteristic angles $\Theta_{KL}$ takes place along a cosine curve.

Figure 6:
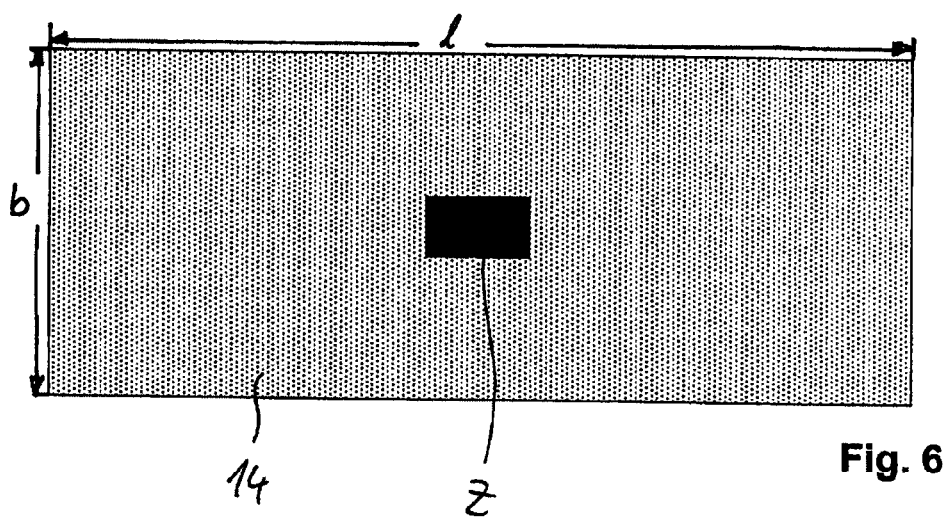
FIG. 6 is a diagrammatic top view of the street to be illuminated, with the first-embodiment lamp unit positioned in the center of the illumination area.

The geometry of lens 4 in the longitudinal direction L predefines a length l of an illuminated street area 14. The geometry of lens 4 in the transverse direction Q predefines a width b of the illuminated street area 14, as is illustrated in FIG. 6. The lamp unit 1 is positioned in a central location, i.e. at center Z of the rectangular illumination area 14.

To make the emission angle characteristic of lamp unit 1 smaller in the transverse direction Q than in the longitudinal direction L, the longitudinal side sections 5 are provided with a peripheral lateral surface 15 and a front surface 16 on the light-exit side 11, so that a partial light beam 17, coupled-in at a relatively large angle in relation to optical axis 10, will be totally reflected at lateral surface 15 and emitted on the front surface 16 more steeply than a corresponding partial light beam 17' of lens 4 coupled in the longitudinal direction L. The longitudinal side sections 5 thus perform a comparatively collimating function for the light rays coupled at a relatively large angle in relation to the optical axis 10 in the transverse direction Q as compared to the light rays 17' coupled at a large angle relative to optical axis 10 in the longitudinal direction L. Maximum light intensity is thus already attained at a second characteristic angle $\Theta_{KQ1}=60°$, as in FIG. 8, which is smaller than $\Theta_{KL}=70°$.

In reference to the longitudinal central plane ML and to the transverse central plane MQ the light intensity distribution shown for the first embodiment is symmetric.

The central section 6 of lens 4 preferably has a scattering effect, with that scattering effect in the longitudinal direction L also extended to the marginal areas as shown in FIG. 2.

Figure 7:
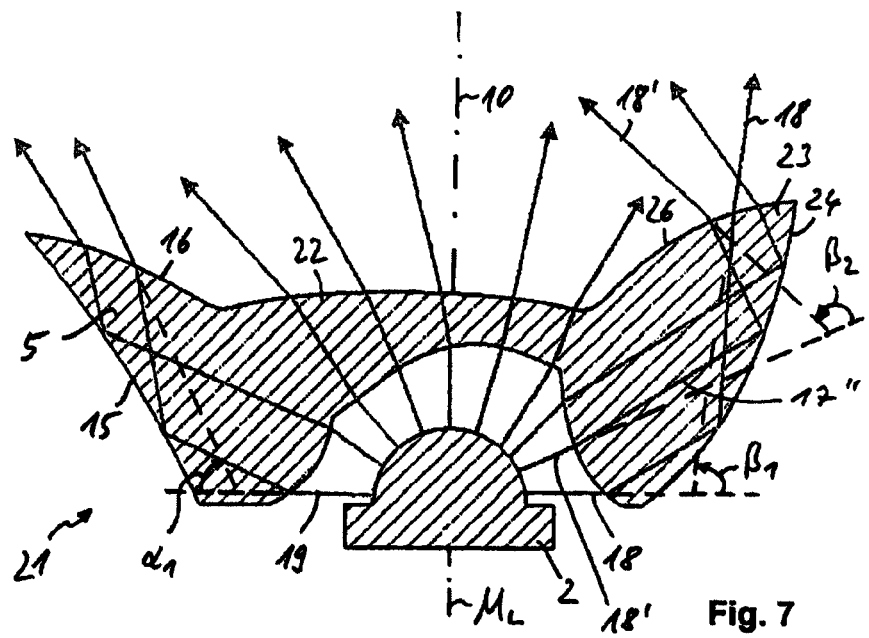
FIG. 7 is a cross section view of a lamp unit according to a second embodiment.

In a second embodiment of a lamp unit 21 as shown in FIGS. 7 to 10, differing from lamp unit 1 according to the first embodiment, a lens 22 is configured asymmetrically in the transverse direction Q as depicted in FIG. 7. In the longitudinal direction L, lens 22 is essentially symmetrical relative to the trans-verse central axis $M_Q$.

Lens 22 features a first longitudinal side section 5 that is identical to longitudinal side section 5 of lens 4, as well as, in an opposite location, a second longitudinal side section 23 whose cross section is bulgier than that of the first longitudinal side section 5.

The bulgy second longitudinal side section 23 has an arched lateral surface 24 which totally reflects, at a relatively large deflection angle, the partial light beam 17" coupled-in at a relatively steep emission angle and, refracted at a front surface 26 of the second longitudinal side section 23 and intersecting optical axis 10 or the longitudinal central plane $M_L$, is emitted.

Figure 8:
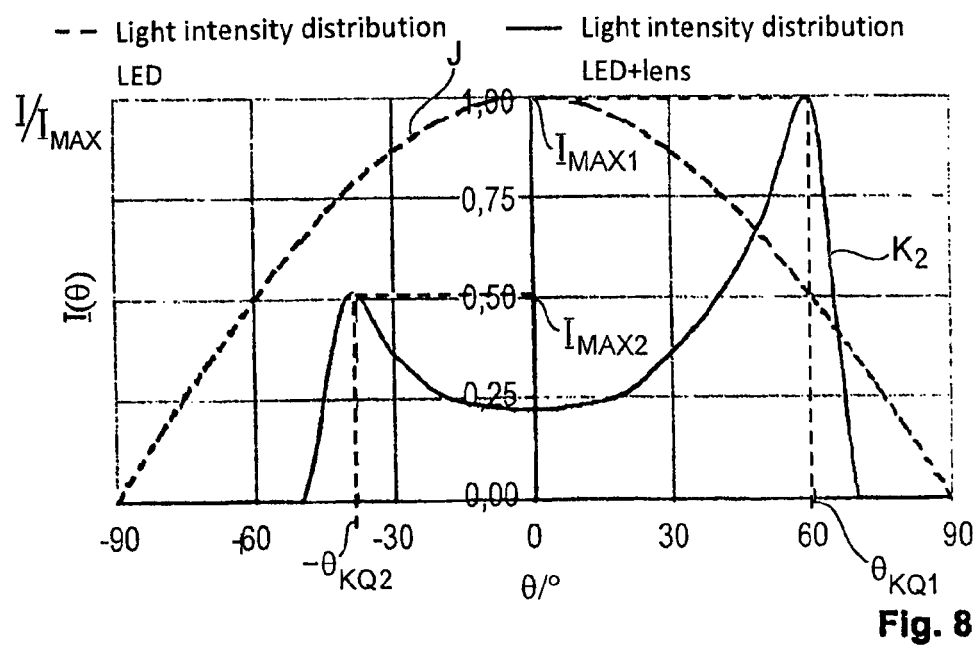
FIG. 8 shows the light intensity distribution of the lamp unit in its second embodiment.
Figure 9:
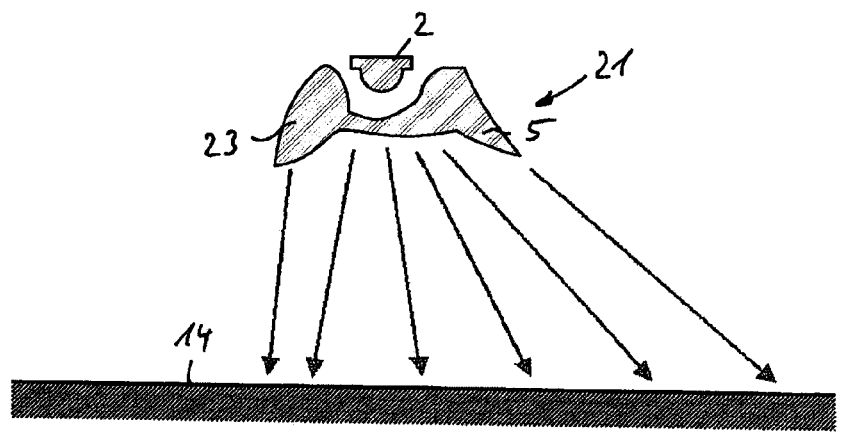
FIG. 9 is a schematic vertical section view of the lamp unit, for use as a street lamp, in its second embodiment for the asymmetric illumination of a street area.
Figure 10:
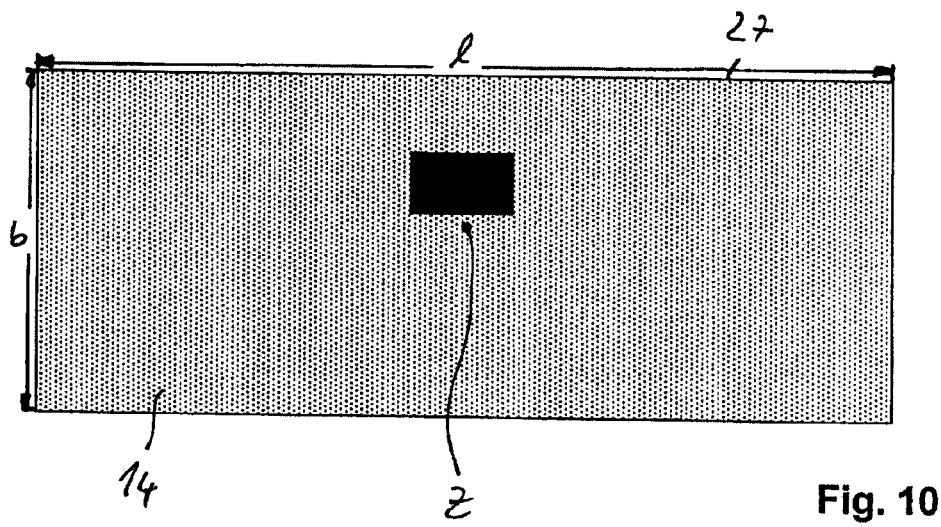
FIG. 10 is a diagrammatic top view of the street to be illuminated, with the second-embodiment lamp unit positioned off-center relative to the illumination area.

A light beam 18 emitted by the light source 2 transversely relative to the longitudinal central plane $M_L$ is deviated at a larger deflection angle $\beta_1$ than a corresponding light beam 19 that impinges on the first longitudinal side section 5 and is deviated at an acute deflection angle $\alpha_1$. Another light beam 18' is deviated at the lateral surface 24 and the front surface 26 at an obtuse angle $\beta_2$ toward optical axis 10. This results in an asymmetric light distribution in the trans-verse direction as shown in FIG. 8, in that the relative maximum of a light distribution $K_2$ generated by the second longitudinal side section 23 is smaller than the maximum generated by the first longitudinal side section and occurs at a second characteristic angle $\Theta_{KQ2}=-40°$. This allows rectangular illumination of the street area 14 even though the lamp unit 21 is not positioned in the center Z of the street area 14 but is laterally offset from the latter. By increasing the bulginess of the second longitudinal side section 23 the asymmetric effect of lamp unit 21 can be further augmented, thus permitting the lamp unit 21 to be positioned for instance at the edge 27 of street area 14. This embodiment will be employed for illuminating a street from one side, with the lighting device positioned for instance in a transitional area between the street and a sidewalk.

Figure 13:
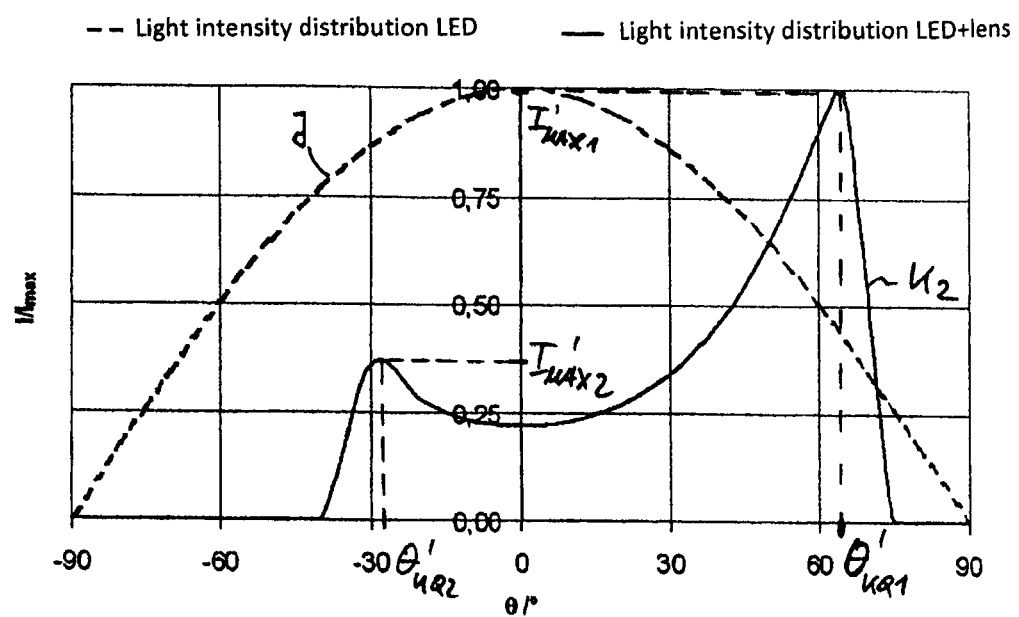
FIG. 13 shows the light intensity distribution of the lamp unit per FIG. 12 in its transverse direction.

Another embodiment, shown in FIGS. 11 to 13, employs a lamp unit 31 which, like lamp unit 21 in the second embodiment, features longitudinal side sections 33, 34 asymmetrically configured in the transverse direction Q. The first longitudinal side section 33 is shaped as an ascending lateral wing that is essentially positioned on a first side of a longitudinal central plane $M_L$ of lens 32. A second longitudinal side section 34 is in the form of a descending lateral wing positioned on the opposite side of the longitudinal central plane $M_L$.

The ascending lateral wing 33 and the descending lateral wing 34 are connected via a central section 35 which extends essentially in an area near the longitudinal central plane ML.

The ascending lateral wing 33 features an outward-arched lightentrance surface 36 which refracts light rays 37 emitted by the light source 2 essentially in the direction of a steeply extending lateral surface 38 which totally reflects them in a manner whereby the light rays 37 are coupled out on a front surface 39 of the ascending lateral wing 33. The front surface 39 is arched from a forward edge of lateral surface 38; the light-entrance surface 36 is arched from a rearward edge of the lateral surface 38, both toward each other up to the central section 35. A forward section, in particular, of the lateral surface 38 extends at a relatively steep angle, meaning that the forward section of the lateral surface 38 extends at a relatively small acute angle toward the longitudinal central plane ML, whereby a proportion of light greater than in the second embodiment is reflected past the longitudinal central plane $M_L$ and to the opposite side in relation to the longitudinal central plane $M_L$ and is coupled out via the front surface 39.

On its side facing the light source 2, the descending lateral wing 34 features an arched entrance surface 40 as well as a front surface 41 and a lateral surface 42 descending against the main emission direction. Due to the shape especially of the lateral surface 42 the light rays 43 coupled into the descending lateral wing 34 are merely refracted in the direction of the longitudinal central axis $M_L$ of lens 32.

The central section 35 features a light-exit surface, whereby incident light rays 44 are refracted toward both sides of the longitudinal central plane $M_L$.

In the transverse direction Q, as depicted in FIG. 13, a light intensity distribution $K'_2$ is generated which, compared to the light intensity distribution $K_2$ of the second embodiment in FIG. 8, exhibits a stronger asymmetry. A first relative maximum Imax1' is reached at a first characteristic angle $\Theta_{KQ1}'=65°$ as compared to $I_{max1}$ in the second embodiment at $\Theta_{KQ1}=60°$. This allows for a comparative increase in range with lens 32. A second relative maximum Imax2' is reached at $\Theta_{KQ2}'=30°$. $I_{max2}'$ is 0.38, so that a quotient from the second relative maximum $I_{max2}'$ to $I_{max2}'$ is the first relative maximum $I_{max1}'$ less than 0.5. That quotient is thus smaller than the corresponding quotient from Imax2 and Imax1 in the second embodiment as in FIG. 8. In total, in the transverse direction, the light intensity distribution of the lamp unit 31 covers an angular range of −40° to +75°. Compared to the preceding embodiment, the result, in particular, is a greater light component in the angular range between 50° and 70° in the transverse direction, allowing for an extended range of coverage.

The light sources preferably employed are LED chips with a beam angle greater than 70°. In the longitudinal direction the lenses 4, 22 are so contoured that the tangential increase of the light intensity distribution K1, K2 is in an angular emission range between 0 and 75°. When the LED light source is in the form of a Lambert-type emitter, the tangential increase of the emission angles $\Theta$ will be in a range from 0 to 55°.

Identical components and component functions of the embodiments described bear identical reference numbers.

In an alternative embodiment, not illustrated, the emission angles $\Theta$ may only extend in sub-ranges according to the tangent function; especially in a range near the optical axis 10 the gradient may be steeper or flatter.

The lighting device lends itself to being used for street lighting but also for interior spaces such as kitchen or living-room furnishings.

It will be appreciated to those skilled in the art having the benefit of this disclosure that this invention is believed to provide street lighting devices and lamps, such as LED-lamps. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 lamp unit
2 light source
3 main emission direction
4 lens
5 longitudinal side section
6 central section
7 light-entrance side (4)
8 cavity
9 light-entrance surface
10 optical axis
11 light-exit side (4)
12 light-exit surface
13 light rays
14 street area
15 lateral surface
16 front surface
17, 17' partial light beam
18 light beam
19 light beam
20 light beam
21 lamp unit
22 lens
23 second longitudinal side section
24 lateral surface
26 front surface
27 edge
b width
J light intensity
$K_1$, $K_2$, $K'_2$ light intensity distribution
L longitudinal direction
l length
$M_L$ longitudinal central plane
$M_Q$ transverse central plane
Q transverse direction
Z center
α1 deflection angle
⊕1, β2 deflection angle
Θ emission angle
$\Theta_{KL}$ first characteristic angle
$\Theta_{KQ}$, $\Theta_{KQ}''$ second characteristic angle
31 lamp unit
32 lens
33 longitudinal side section
34 longitudinal side section
35 central section
36 light-entrance surface
37 light rays
38 lateral surface
39 front surface
40 light-entrance surface
41 front surface
42 lateral surface
43 light rays
44 light rays
$I_{max}'$, $I_{max1}'$ relative maximum
$I_{max2}$, $I_{max2}'$ relative maximum

The invention claimed is:

1. A lighting device comprising:
   a light source defining an optical axis; and
   a rotationally-asymmetric lens positioned in front of the light source and having
      a concave light-entrance surface facing the light source such that light emitted by the light source is coupled into the lens therethrough,
      a light-exit surface facing away from the light source such that light that has been coupled into the lens through the concave light-entrance surface is out-coupled through the light-exit surface;
      a first cross-section in a first plane that contains the optical axis, said first cross-section representing at least one catadioptric portion of the lens; and
      a second cross-section in a second plane that contains the optical axis and that is transverse to the first plane, the second cross-section being substantially symmetric with respect to the optical axis.

2. A lighting device according to claim 1, wherein said at least one catadioptric portion includes two batwing portions of the lens, each batwing portion laterally extending away from the light source.

3. A lighting device according to claim 1, wherein said at least one catadioptric portion includes an ascending wing portion of the lens laterally extending away from the light source, and wherein the lens further includes a descending wing portion of the lens laterally extending towards the light source.

4. A lighting device according to claim 3, characterized in that the ascending wing portion and the descending wing portion are configured to outcouple light received from the light source through the lens within an angle range, measured in the first plane, between about −40 degrees and about −75 degrees with respect to the optical axis.

5. A lighting device according to claim 1, wherein the light-entrance and light-exit surfaces of the lens are configured to transmit light from the light source through the lens such that intensity distribution of said transmitted light exhibits, in the second plane, a tangential dependence as a function of angle measured with respect to the optical axis.

6. A lighting device according to claim 5, wherein the intensity distribution, in the second plane, of said transmitted light is symmetric with respect to the optical axis.

7. A lighting device according to claim 5, wherein said intensity distribution exhibits the tangential dependence in a continuous range of angles including a zero angle.

8. A lighting device according to claim 1, wherein the light-entrance and light-exit surfaces are configured to transmit light from the light source through the lens such that intensity distribution of said transmitted light
increases, as a function of angle measured with respect to the optical axis, a) up to a first characteristic angle, in the first plane and b) up to a second characteristic angle in the second plane, the second characteristic angle being larger than the first characteristic angle, and
in each of the first and second planes, decreases toward zero an angles exceeding the corresponding first and second characteristic angles,
thereby defining maxima of light intensity distribution at first and second characteristic angles.

9. A lighting device according to claim 1, wherein said concave light-entrance surface is bell-shaped and rotationally symmetric with respect to the optical axis.

10. A lighting device according to claim 1, wherein the at least two catadioptric portions include two catadioptric portions and characterized in that the two catadioptric portions are configured to generate a light intensity distribution having, in the first plane, first and second maxima and a quotient from a second maximum in relation to the first maximum that is less than 0.5.

11. A lighting device according to claim 1, wherein said concave light-entrance surface has an oval profile in the first plane and a bell-shaped profile in the second plane.

12. A lighting device comprising:
a light source defining an optical axis; and
a rotationally-asymmetric conchiform lens positioned in front of the light source and having
a concave light-entrance surface facing the light source such that light emitted by the light source is coupled into the lens therethrough,
a light-exit surface facing away from the light source such that light that has been coupled into the lens through the concave light-entrance surface is outcoupled through the light-exit surface;
a first cross-section in a first plane that contains the optical axis, said first cross-section representing at least one side portion of the lens that is shaped to both refract and totally internally reflect light received from the light source, said at least one portion of the lens being devoid of a planar surface, and
a second cross-section in a second plane that contains the optical axis and that is transverse to the first plane, the second cross-section being substantially symmetric with respect to the optical axis.

13. A lighting device according to claim 12, wherein said at least one side portion includes an ascending wing portion of the lens laterally extending away from the light source, and wherein the lens further includes a descending wing portion of the lens laterally extending towards the light source.

14. A lighting device according to claim 12, wherein the light-entrance and light-exit surfaces of the lens are configured to transmit light from the light source through the lens such that intensity distribution of said transmitted light exhibits, in the second plane, a tangential dependence as a function of angle measured with respect to the optical axis.

15. A lighting device according to claim 12, wherein the light-entrance and light-exit surfaces are configured to transmit light from the light source through the lens such that intensity distribution of said transmitted light
increases, as a function of angle measured with respect to the optical axis, a) up to a first characteristic angle, in the first plane and b) up to a second characteristic angle in the second plane, the second characteristic angle being larger than the first characteristic angle, and
in each of the first and second planes, decreases toward zero an angles exceeding the corresponding first and second characteristic angles,
thereby defining maxima of light intensity distribution at first and second characteristic angles.

16. A lamp unit comprising:
a source of light defining an optical axis; and
a lens having a plane of symmetry and a normal plane perpendicular to said plane of symmetry, the plane of symmetry and the normal plane intersecting along the optical axis, said lens adapted to transmit light, generated by the source of light when the source of light is switched on, such as to form a light output spatial distribution,
wherein said light output spatial distribution has a first angle of divergence in a first cross-section defined by the plane of symmetry and a second angle of divergence in a second cross-section defined by the normal plane, said first angle being asymmetric with respect to the normal plane and said second angle being symmetric with respect to the plane of symmetry.

17. A lamp unit according to claim 16, wherein said plane of symmetry is the only plane of symmetry of said lens.

18. A lamp unit according to claim 16, wherein said lens includes a conchiform lens.

19. A lighting module comprising a plurality of lamp units according to claim 16, configured as a linear array such that planes of symmetry of lamp units of said array are parallel to one another.

20. A lighting module comprising a plurality of lamp units according to claim 16, configured as a linear array such that planes of symmetry of lamp units of said array coincide with one another.

* * * * *